(12) United States Patent
Umezawa et al.

(10) Patent No.: US 8,159,767 B2
(45) Date of Patent: Apr. 17, 2012

(54) REPEATABLE RUNOUT EVALUATION METHOD FOR A STAMPER

(75) Inventors: Kazuyo Umezawa, Yokohama (JP); Seiji Morita, Yokohama (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 12/538,718

(22) Filed: Aug. 10, 2009

(65) Prior Publication Data
US 2010/0143517 A1   Jun. 10, 2010

(30) Foreign Application Priority Data

Dec. 10, 2008 (JP) ................................. 2008-314760

(51) Int. Cl.
*G11B 5/86* (2006.01)

(52) U.S. Cl. ......................................................... 360/15
(58) Field of Classification Search .................. None
See application file for complete search history.

(56) References Cited

U.S. PATENT DOCUMENTS

| 7,283,457 | B2 * | 10/2007 | Yamaga et al. | |
| 2004/0180174 | A1 * | 9/2004 | Niitsuma et al. | 428/66.3 |
| 2008/0118697 | A1 * | 5/2008 | Takahashi et al. | 428/64.4 |

FOREIGN PATENT DOCUMENTS

| JP | 02-149121 | A | 6/1990 |
| JP | 02-149121 | * | 7/1990 |
| JP | 2003-281791 | * | 10/2003 |
| JP | 2003-281791 | A | 10/2003 |
| JP | 2004-110896 | * | 4/2004 |
| JP | 2004-110896 | A | 4/2004 |
| JP | 2005-317054 | A | 11/2005 |
| JP | 2006-030055 | A | 2/2006 |
| JP | 2007-012258 | * | 1/2007 |
| JP | 2007-012258 | A | 1/2007 |
| JP | 2008-198335 | A | 8/2008 |
| JP | 2008-251141 | A | 10/2008 |
| WO | WO 2007/111260 | A1 | 10/2007 |

OTHER PUBLICATIONS

Notice of Reasons for Rejection mailed by Japan Patent Office on Dec. 22, 2009 in the corresponding Japanese patent application No. 2008-314760.
Notice of Reasons for Rejection mailed by Japan Patent Office on May 11, 2010 in the corresponding Japanese patent application No. 2008-314760.
Decision of Rejection mailed by Japan Patent Office on Aug. 10, 2010 in the corresponding Japanese patent application No. 2008-314760.
Explanation of Non-English Language References.*

* cited by examiner

*Primary Examiner* — Daniell L Negron
(74) *Attorney, Agent, or Firm* — Knobbe, Martens, Olson & Bear, LLP

(57) ABSTRACT

According to one embodiment, a stamper has three-dimensional patterns in a dummy region. The three-dimensional patterns have a repeatable run out of 1 nm or less between the 15th and 40th orders when the rotational frequency is the first order as a reference.

3 Claims, 9 Drawing Sheets

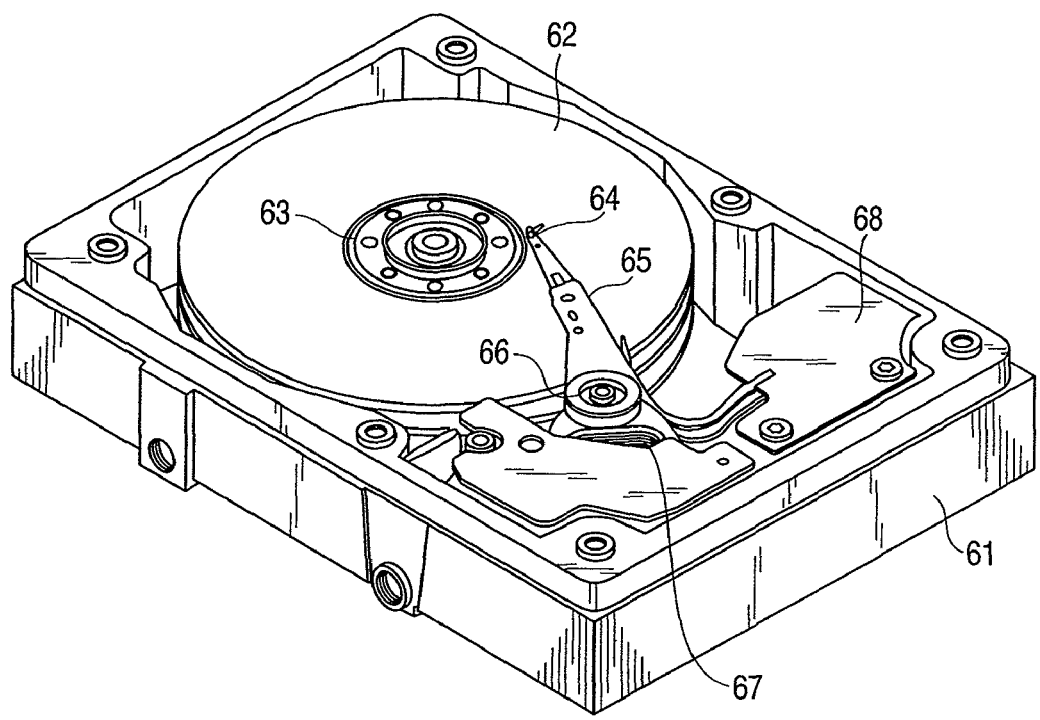
F I G. 5
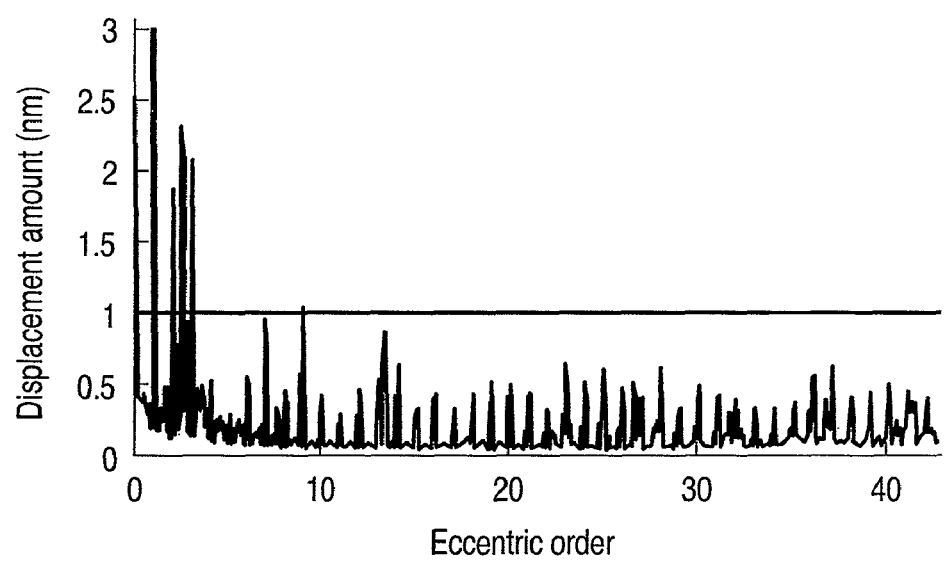
F I G. 6

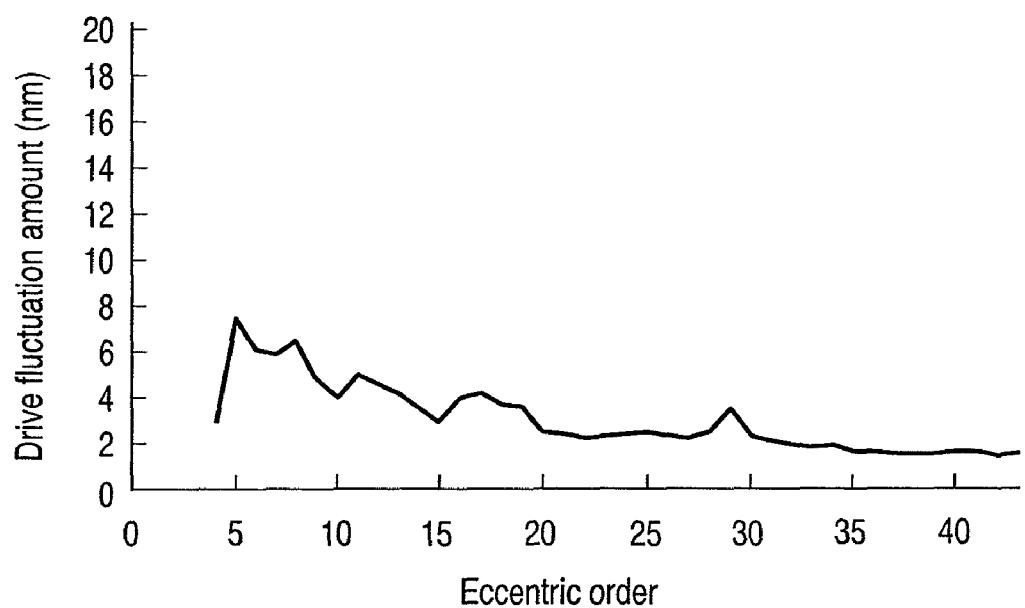
F I G. 9
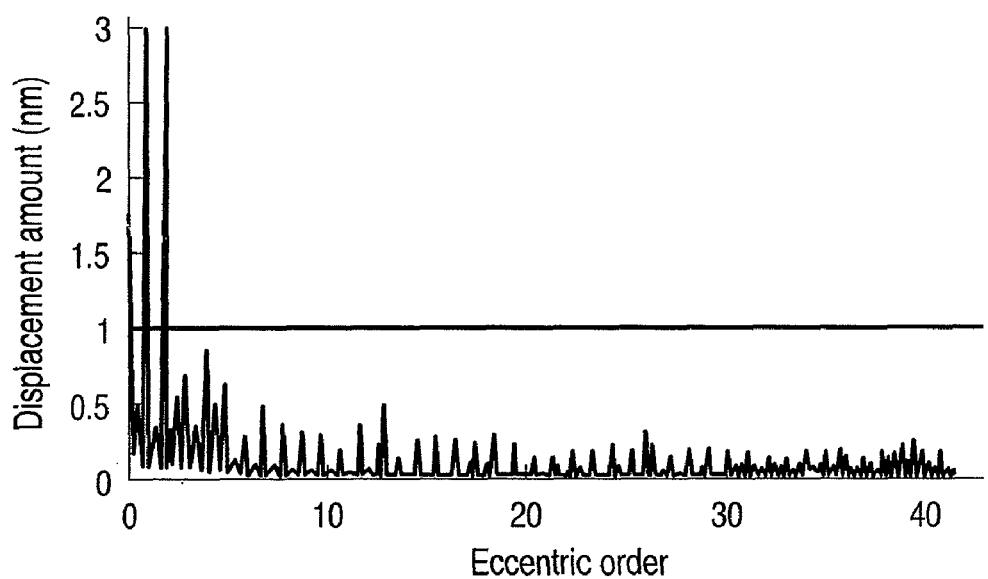
F I G. 10

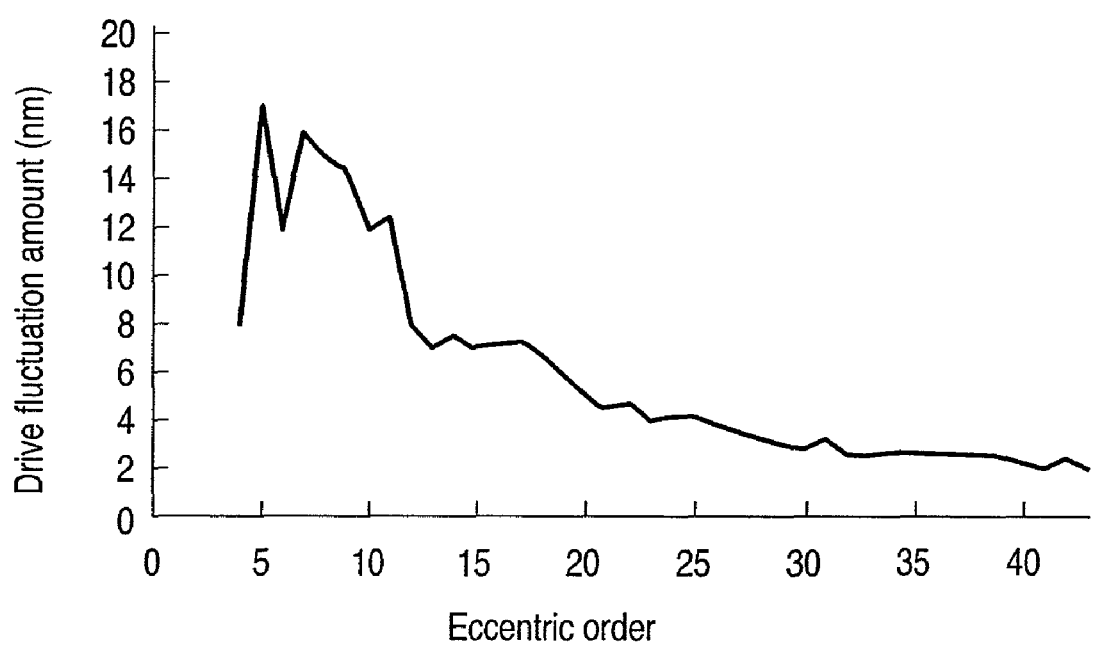
F I G. 13

REPEATABLE RUNOUT EVALUATION METHOD FOR A STAMPER

CROSS-REFERENCE TO RELATED APPLICATIONS

This application is based upon and claims the benefit of priority from Japanese Patent Application No. 2008-314760, filed Dec. 10, 2008, the entire contents of which are incorporated herein by reference.

BACKGROUND

1. Field

One embodiment of the present invention relates to a stamper for transferring patterns and, more particularly, to a stamper to be used when transferring three-dimensional patterns of the stamper onto a recording medium.

2. Description of the Related Art

Recently, as the recording density of an information recording medium increases, marks to be recorded on the medium are becoming finer. To facilitate the formation of fine recording marks, a demand has arisen for a micropatterning technique of forming three-dimensional patterns of about 100 nm or less on a recording medium. As the micropatterning technique like this, a method of combining the formation of fine patterns by lithography such as electron beam (EB) lithography or focused ion beam (FIB) lithography and the transfer of the fine patterns onto a medium substrate by nanoimprint lithography (NIL) is being studied.

On the other hand, as a medium technique for increasing the recording density, a magnetic recording system using a discrete track recording (DTR) medium having a data area and servo area is known. Three-dimensional track patterns on a recording layer of this DTR medium are formed by etching. As disclosed in, e.g., Jpn. Pat. Appln. KOKAI Publication No. 2004-110896, a stamper having three-dimensional patterns corresponding to track shapes is pressed against a resist layer to be used as an etching mask in order to transfer the patterns onto the resist layer.

Also, optical disks such as a Compact Disc (CD) and Digital Versatile Disc (DVD) are similarly required to have large capacities, and the development of multilayered-structure optical disks is advancing. A method of manufacturing the multilayered-structure optical disk is disclosed in, e.g., Jpn. Pat. Appln. KOKAI Publication No. 2003-281791. In this method, a transparent resin substrate formed from an Ni stamper by injection molding and a transparent resin stamper similarly formed by injection molding are bonded via a 2P(photopolymer) resin, and the 2P resin is cured by ultraviolet (UV) radiation. After that, patterns are transferred by separating the transparent stamper, and a multilayered-structure medium film having a thickness of a few ten μm is formed on the transferred patterns.

As the recording density of an information recording medium increases, a hard disk drive (HDD) is required to have more accurate access performance. Therefore, it is becoming more and more important to decrease the repetitive rotational error, i.e., a so-called repeatable runout (RRO) of track patterns of a recording medium. As disclosed in, e.g., Jpn. Pat. Appln. KOKAI Publication No. 2007-12258, the RRO is evaluated in an HDD after a recording medium is completed. For example, the RRO is calculated by using a positional error signal sampled when a head follows tracks on a recording medium.

Unfortunately, the RRO of the DTR medium largely depends on the characteristics of a stamper used in the process of the DTR medium. Accordingly, demands have arisen for decreasing the RRO of the stamper.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is a view showing a magnetic recording/reproduction apparatus for performing recording and reproduction on a magnetic recording medium;

FIG. 6 is a graph showing the eccentric order and displacement amount of a dummy groove according to Embodiment 1;

FIG. 9 is a graph showing the eccentric order and displacement amount of a drive according to Embodiment 2;

FIG. 10 is a graph showing the eccentric order and displacement amount of a dummy groove according to Embodiment 3;

FIG. 13 is a graph showing the eccentric order and displacement amount of a drive according to the comparative embodiment.

DETAILED DESCRIPTION

Various embodiments according to the invention will be described hereinafter with reference to the accompanying drawings. In general, according to one embodiment of the invention, one major surface of a stamper of the present invention has concentric or spiral three-dimensional patterns for forming track patterns on the surface of a recording layer of a recording medium. The three-dimensional patterns have a main region corresponding to a data area including a data recording portion and address portion, and a dummy region except for the main region. In the stamper of the present invention, the order of the RRO of the three-dimensional patterns in this dummy region is the 15th to 40th when the order of the rotational frequency is the first as a reference.

One major surface of a stamper of the present invention has concentric or spiral three-dimensional patterns for forming track patterns on the surface of a recording layer of a recording medium. The three-dimensional patterns have a main region corresponding to a data area including a data recording portion and address portion, and a dummy region except for the main region. In the stamper of the present invention, the order of the RRO of the three-dimensional patterns in this dummy region is the 15th to 40th when the order of the rotational frequency is the first as a reference.

When using the stamper of the present invention, it is possible to reduce the RRO of a recording medium, and obtain a recording medium having high reliability.

An embodiment of a DTR medium manufacturing method according to the present invention will be briefly explained below with reference to FIGS. 1A to 1F.

Figure 1A:
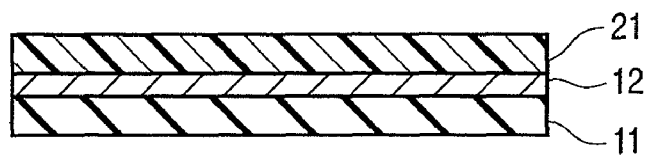
FIGS. 1A to 1F are sectional views showing an embodiment of a DTR medium manufacturing method.
Figure 1B:
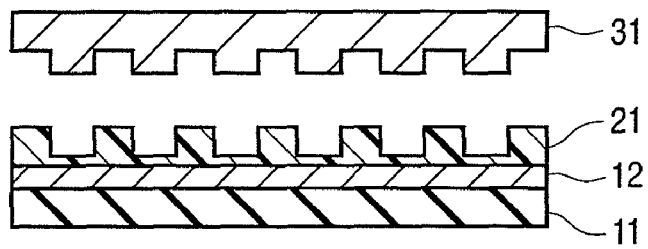
Figure 1C:
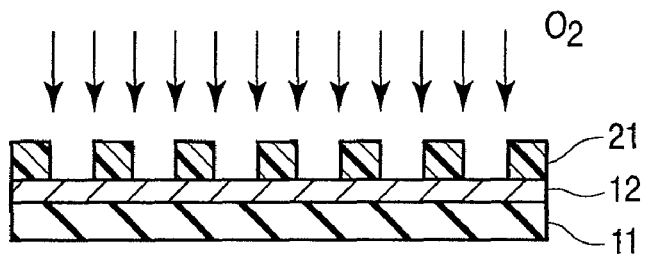
Figure 1D:
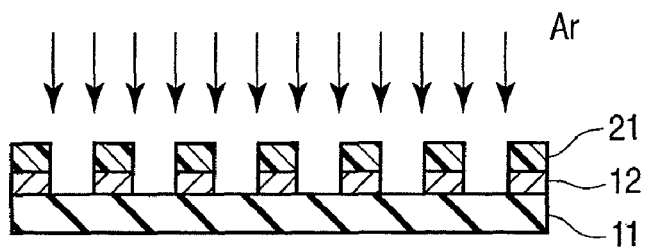
Figure 1E:
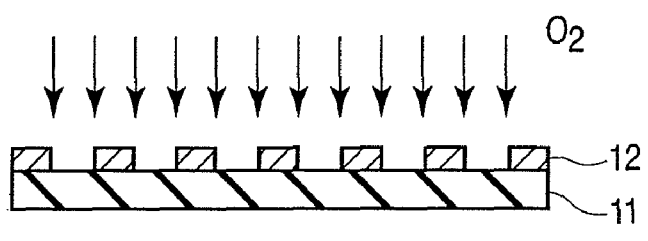
Figure 1F:
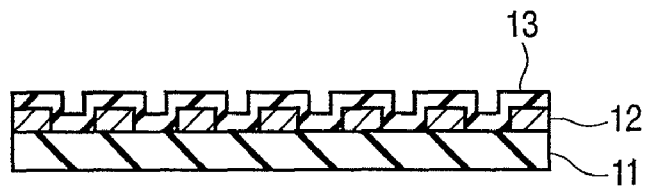

First, as shown in FIG. 1A, a magnetic layer 12 is formed on a substrate 11 and coated with a resist 21. Subsequently, as shown in FIG. 1B, the pattern surface of a stamper 31 having three-dimensional patterns is opposed to the resist 21, and the patterns of the stamper 31 are transferred onto the resist 21 by imprinting. After that, as shown in FIG. 1C, a resist residue remaining in recesses of the resist 21 is removed by reactive ion etching using oxygen gas. Furthermore, as shown in FIG. 1D, the patterned resist 21 is used as a mask to etch the magnetic layer 12 by ion milling. As shown in FIG. 1E, the residual resist 21 is removed by oxygen ashing. A nonmagnetic material (not shown) is buried in the recesses as needed, and a protective film 13 is formed on the entire surface as shown in FIG. 1F. In this manner, a DTR medium is manufactured.

Imprinting is roughly classified into the following three types.

1) Thermal Imprinting

This imprinting is superior in mass-productivity because an Ni stamper can be used as a mold. However, imprinting is performed by heating and cooling both a substrate to be imprinted and the mold. Since it takes a long time to increase and decrease the temperature and the throughput is low, this imprinting is regarded as unsuitable for mass-production. This is so because the mold and a support of the mold have large heat capacities, and this prolongs the heating time and cooling time. Although a mechanism for forcedly cooling the mold support may be installed in an apparatus, the mechanism has a large scale. Also, to transfer nanometer-order patterns onto a large area well, a metal mold designed to be able to uniformly imprint an entire surface is necessary. However, it is difficult to incorporate the forced cooling mechanism in this exclusively designed metal mold.

2) High-Pressure Imprinting

This imprinting is also superior in mass-productivity because an Ni stamper can be used as a mold. In addition, since no special mechanism need be incorporated into an apparatus, it is possible to use a dedicated metal mold (mold support) capable of transferring nanometer-order patterns onto a large area well. However, a high pressure is necessary to transfer patterns well, so the Ni stamper itself may deform. Also, since a resist elastically deforms, a time of about one minute is necessary before the resist completely deforms by imprinting.

3) Optical Imprinting

This imprinting is performed on a photosetting resin by using a light-transmitting mold (e.g., quartz or diamond), and superior in shape transfer properties and throughput. However, the light-transmitting mold is difficult to manufacture.

Various methods of NIL have been examined by, e.g., combining the three basic methods described above. However, 1) thermal imprinting and 2) high-pressure imprinting particularly have the problem of low throughput.

Next, a method of evaluating the RRO of a stamper will be explained.

The method will be explained by taking a 1.8-inch magnetic recording medium resin stamper molded to have a thickness of 0.6 mm as an embodiment.

This resin stamper has data areas in the range of r=15.0-23.0 mm, and dummy grooves in the range of r=25.0 to 26.0 mm. The dummy grooves are concentric, and have a track pitch of 0.4 μm (L/G=200 nm/200 nm) and a depth of 50 nm.

Note that in the above embodiment, no dummy region exists on the magnetic recording medium. However, a dummy region may also be formed in the inner periphery or between the data areas on the magnetic recording medium. In this case, the RRO can be checked directly from the dummy region of the magnetic recording medium.

An apparatus for checking the RRO of a stamper will be explained below.

Figure 2:
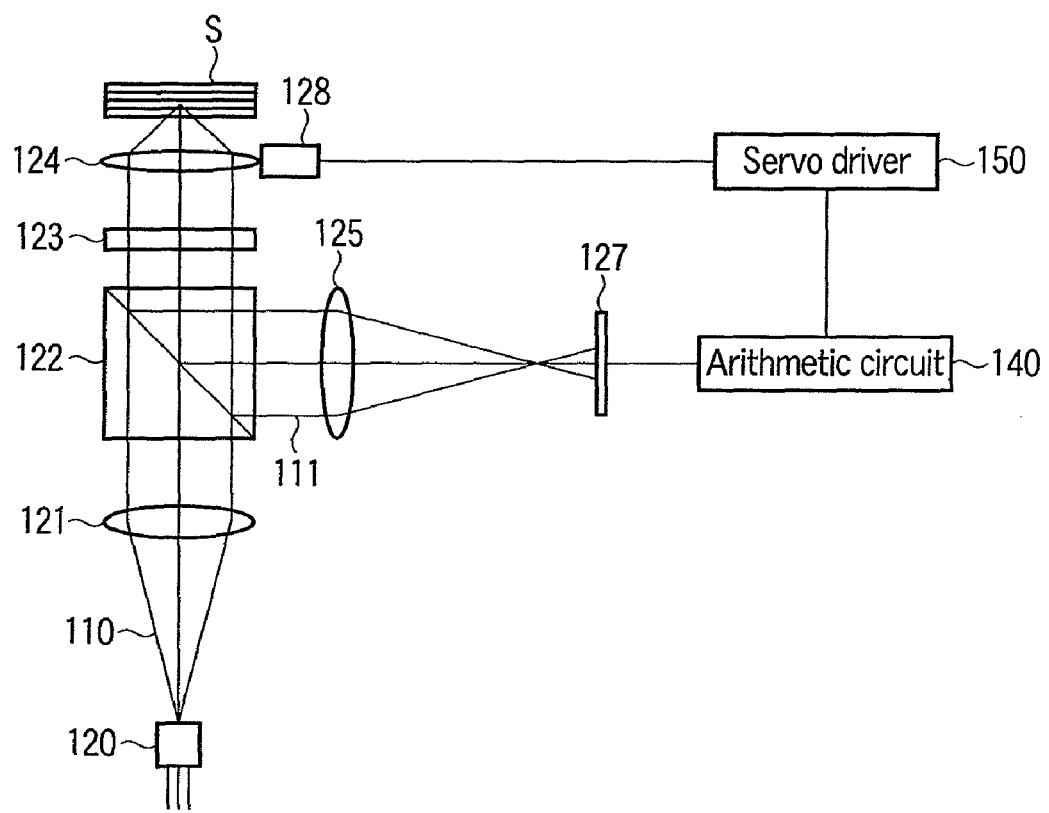
FIG. 2 is a block diagram showing an outline of the arrangement of a stamper evaluation apparatus for reproducing information from a stamper.

FIG. 2 is a block diagram showing an outline of the arrangement of an RRO evaluation apparatus for checking the RRO by reproducing information from dummy grooves of a stamper.

As shown in FIG. 2, the stamper is made of, e.g., a resin. A semiconductor laser source 120 is used as a light source. The wavelength of the exit light is, e.g., a violet wavelength band in the range of 400 to 410 nm. Exit light 110 from the semiconductor laser source 120 is collimated into parallel light by a collimator lens 121, and this parallel light enters an objective lens 124 through a polarizing beam splitter 122 and λ/4 plate 123. After that, the light is transmitted through a substrate of a stamper S, and concentrated on a substrate surface in which the grooves are formed. The numerical aperture (to be referred to as the NA hereinafter) of the laser changes in accordance with a medium as an object. For example, when an evaluation method is to transmit the laser through a 0.6-mm-thick resin stamper, the NA is about 0.5 to 0.7. On the other hand, when using a stamper such as an Ni stamper made of a material that does not transmit light, or when reproducing information from the surface of a resin stamper, the NA can be adjusted to 0.85 or more, or an aberration correcting plate corresponding to a 0.6-mm-thick resin material can be inserted between the laser and stamper. Reflected light 111 from an information recording layer of the stamper is transmitted through the substrate of the stamper S again, transmitted through the objective lens 124 and λ/4 plate 123, and reflected by the polarizing beam splitter 122. After that, the reflected light 111 enters a photodetector 127 through a condenser lens 125.

A light-receiving unit of the photodetector 127 is normally divided into a plurality of portions, and each light-receiving portion outputs an electric current corresponding to the light intensity. The output current is converted into a voltage by an I/V amplifier (current-voltage converter) (not shown), and the voltage is input to an arithmetic circuit 140. The arithmetic circuit 140 performs an arithmetic operation on the input voltage signal, thereby generating a tilt error signal, HF signal, focusing error signal, and tracking error signal. The tilt error signal is used to perform tilt control. The HF signal is used to reproduce information recorded on an optical disk D. The focusing error signal is used to perform focusing control. The tracking error signal is used to perform tracking control.

The objective lens 124 can be driven in the vertical, disk radial, and tilt directions (radial direction and/or tangential direction) by an actuator 128, and is controlled to follow information tracks on the stamper S by a servo driver 150.

Note that in this evaluation apparatus, the wavelength of the semiconductor laser is in the range of 400 to 410 nm as an embodiment. However, the present invention is not limited to this, and the wavelength can also be shorter. Note also that in this evaluation apparatus, the track pitch of the dummy grooves of the stamper can be made smaller than, e.g., 0.4 μm. When the semiconductor laser has a long wavelength, the track pitch of the dummy grooves of the stamper needs to be larger than 0.4 μm. The track pitch can be determined by the laser spot diameter. When performing tracking by using a push-pull method of the evaluation apparatus, the track pitch of the dummy grooves of the stamper can be 0.5 to 1.2 times the laser spot diameter. The laser spot diameter can be represented by λ/NA. For example, when the laser wavelength is 405 nm and the NA is 0.65, the dummy groove track pitch can be 0.31 to 0.75 μm. Also, when using, e.g., a fixed laser having a wavelength of 355 nm and an NA of 0.85, the laser spot diameter is 0.42 μm, so a minimum track pitch can be 0.2 μm. If the track pitch is too large, the dummy region widens, and the laser spot diameter of the evaluation apparatus also tends to increase. This often results in rough evaluation on the data area. Therefore, the track pitch is preferably as small as possible. On the other hand, a laser wavelength narrower than 355 nm is hard to handle and hence is unrealistic. Accordingly, the lower limit of the dummy groove track pitch can be 0.2 μm.

Information can be reproduced from the stamper of the present invention by using the RRO evaluation apparatus as described above. In this embodiment, DDU-1000 manufactured by Pulstec was used. The laser wavelength was 405 nm, and the NA was 0.65.

A method of evaluating the RRO of the stamper will be explained below.

The stamper was set in the above evaluation apparatus, and rotated at a linear velocity of 1.2 m/s. Note that the linear velocity is such that the tracking characteristic of the apparatus tends to decrease from a certain point as the frequency increases (servo gain characteristic). Therefore, the linear velocity is preferably as low as possible, provided that it is equal to or higher than a minimum rotational speed of a spindle motor. This makes it possible to check a high-order component of the RRO more accurately by amplifying the displacement amount of the order. In this evaluation apparatus, one rotation of the disk is converted into a frequency, and the eccentric order is represented by this rotational frequency.

The laser was emitted, and the tilt and offset were adjusted such that a difference signal (push-pull signal) was maximum, thereby performing tracking. The frequency of the push-pull signal after tracking was analyzed by using an FFT analyzer (CF-5210 manufactured by Ono Sokki).

Then, tracking was turned off, and the peak-to-peak value of the same push-pull signal was checked while only focusing was adjusted. This peak-to-peak voltage corresponds to a half-track pitch displacement amount. The displacement amount was calculated by dividing the voltage at each frequency measured by the FFT analyzer by the peak-to-peak voltage. Note that the measurement conditions of the FFT analyzer were given such that one track was measured 100 times, the averaged data was set as one measurement, and a maximum of the results of five measurements performed by changing tracks in the dummy region was regarded as the displacement amount. The calculation result was regarded as the RRO of the stamper in the present invention. Assuming that the rotational frequency of the stamper was the first order as a reference, the displacement amounts of the 15th to 40th orders were observed. When the order is less than the 15th, an error easily occurs in accordance with the position of the stamper. Also, a displacement amount stable to some extent is obtained without measuring the displacement amount exceeding the 40th order.

In the above embodiment, a stamper in which the dummy groove had a land-to-groove ratio of 1:1 was used. However, the present invention is not limited to this. The apparatus for checking the RRO has the characteristic that tracking is impossible if PP/SUM obtained by normalizing an amplitude (p-p) of a push-pull signal PP by a voltage (p-G) of a sum signal SUM is at least PP/SUM<0.1. Therefore, it is possible to select a land-to-groove ratio by which tracking can be performed by preventing this.

The present invention will be explained in more detail below by way of its embodiments.

In the following embodiments, several resin stampers were used to transfer three-dimensional patterns onto ultraviolet-curable resin layers applied on medium substrates, thereby manufacturing DTR magnetic recording media.

A DTR magnetic recording medium has a plurality of servo areas, and a plurality of data areas divided by these servo areas. A preamble portion, address portion, and burst portion are formed in each servo area. Discrete tracks are formed in each data area. Note that each figure is an exemplary view for explaining the invention and facilitating understanding of the explanation, and the shapes, dimensions, ratios, and the like are different from actual ones. However, the shapes, dimensions, ratios, and the like can be appropriately changed in consideration of the following explanation and well-known techniques.

First, a recording medium manufacturing method common to each embodiment and a comparative embodiment will be described.

A transparent stamper was manufactured by the following method.

First, a master was coated with a resist, and a servo area and data area were written by electron beam lithography, thereby forming a resist master. A positive resist was used as the resist, and the thickness of the resist was set to 50 nm. Three-dimensional patterns corresponding to discrete tracks in the data area had a track pitch (TP) of 100 nm (L/G=70 nm/30 nm), and a depth of 50 nm. Also, concentric grooves were formed 5 mm outside the data portion. The grooves had a track pitch of 400 nm (L/G=200 nm/200 nm), and a depth of 50 nm.

An Ni stamper for injection molding was manufactured by performing electroforming on the resist master. Note that as the Ni stamper, it is possible to use any of a so-called father stamper initially manufactured from the master; a mother stamper duplicated from the father stamper by electroforming; and a son stamper duplicated from the mother stamper by electroforming.

The Ni stamper was used to manufacture transparent stampers A to D by injection molding by using a cycloolefin polymer (COP).

Polycarbonate (PC) can be used as the material of the transparent stampers. When the releasability to a 2P resin is taken into consideration, however, it is possible to use, e.g., COP, a cycloolefin copolymer (COC), or polymethylmethacrylate (PMMA). It is also possible to mix an organic compound containing a fluorine substituent or silicon as a releasing agent in each material.

Figure 3A:
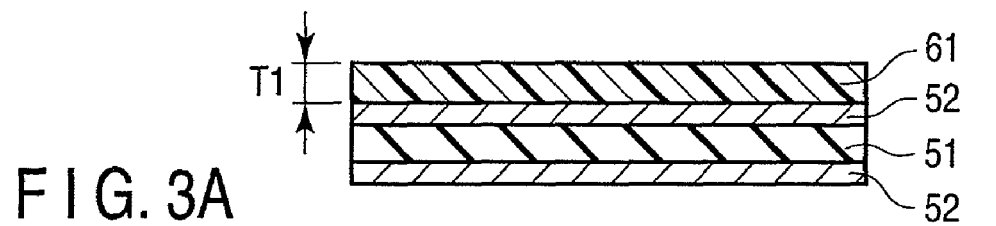
FIGS. 3A to 3D are sectional views showing an embodiment of a pattern transfer method.

As shown in FIG. 3A, magnetic layers 52 were formed on the two surfaces of a donut-like glass substrate 51 as a medium substrate.

As the magnetic layer, it is possible to use a so-called perpendicular double-layered medium having a perpendicular magnetic recording layer on a soft magnetic (backing) layer.

As the soft magnetic (backing) layer, materials containing Fe, Ni, and Co can be used. Embodiments of the materials are FeCo-based alloys such as FeCo and FeCoV, FeNi-based alloys such as FeNi, FeNiMo, FeNiCr, and FeNiSi, FeAl-based alloys, FeSi-based alloys such as FeAl, FeAlSi, FeAl- SiCr, FeAlSiTiRu, and FeAlO, FeTa-based alloys such as FeTa, FeTaC, and FeTaN, and FeZr-based alloys such as FeZrN.

The perpendicular magnetic recording layer can contain Co as a main component and can also contain Pt. It is also possible to use a material further containing an oxide. As the oxide, it is possible to use, e.g., silicon oxide or titanium oxide.

Magnetic grains (magnetic crystal grains) can be dispersed in the perpendicular magnetic recording layer. The magnetic grain can have a columnar structure vertically extending through the perpendicular magnetic recording layer. This structure can improve the orientation and crystallinity of the magnetic grains in the perpendicular magnetic recording layer. Consequently, a signal-to-noise ratio (SNR) suited to high-density recording can be obtained. To obtain this structure, the amount of oxide to be contained is important. The content of oxide can be 3 to 12 mol %, and can also be 5 to 10 mol % of the total amount of Co, Cr, and Pt. When the content of oxide in the perpendicular magnetic recording layer falls within the above range, the oxide deposits around the magnetic grains when the layer is formed. This makes it possible to isolate and reduce the size of the magnetic grains.

The thickness of the perpendicular magnetic recording layer can be 5 to 60 nm, and can also be 10 to 40 nm. When the thickness of the perpendicular magnetic recording layer is in the range of 5 to 60 nm, the medium can operate as a magnetic recording/reproduction apparatus more suitable for high-density recording. If the thickness of the perpendicular magnetic recording layer is less than 5 nm, the reproduction output is too low, and the noise component often becomes higher than the reproduction output. If the thickness of the perpendicular magnetic recording layer exceeds 60 nm, the reproduction output becomes too high and often distorts the waveform.

The magnetic layer 52 on one surface of the glass substrate 51 is spin-coated, so as not to cover the central hole, with an ultraviolet-curable resin (to be referred to as a 2P resin) having a viscosity of 5 cps, and the 2P resin was spread at a rotational speed of 10,000 for 30 seconds, thereby forming a 2P resin layer 61 having a thickness T1 of 60 nm.

Figure 3B:
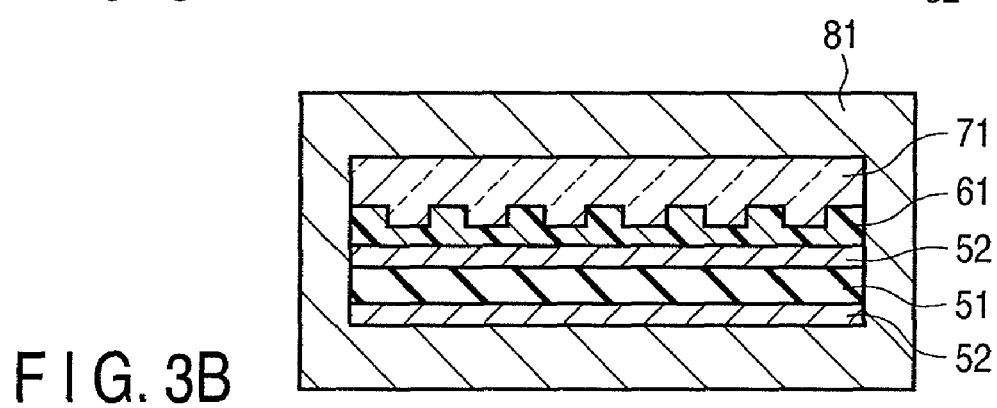

As shown in FIG. 3B, a first transparent resin stamper 71 having three-dimensional patterns was prepared.

In a vacuum chamber 81, one surface of the glass substrate 51 and the pattern surface of the first transparent stamper 71 were bonded via the 2P resin layer 61 in a vacuum ambient at $10^3$ Pa or less.

Figure 3C:
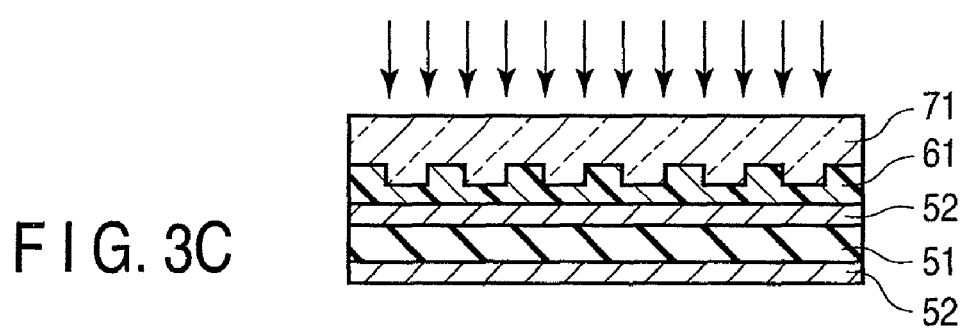

As shown in FIG. 3C, the vacuum was released, and the 2P resin 61 was cured by UV radiation through the first transparent stamper 71 at atmospheric pressure. Although the time required for curing depends on the curing characteristics of a polymerization initiator contained in the 2P resin used and the ability of a UV light source, the resin is normally curable for a few tens of seconds.

Figure 3D:
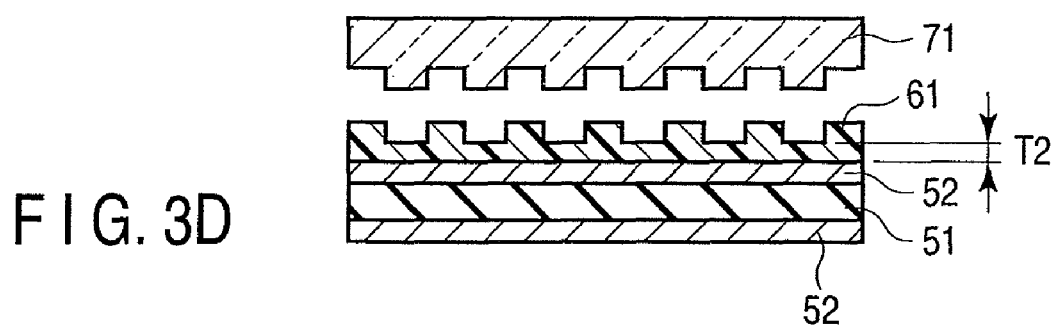

As shown in FIG. 3D, the first transparent stamper 71 was separated from the glass substrate 51, thereby forming a 2P resin layer 61 onto which the three-dimensional patterns were transferred. A thickness T2 of the 2P resin layer 61 remaining in recesses was 30 nm.

Figure 4A:
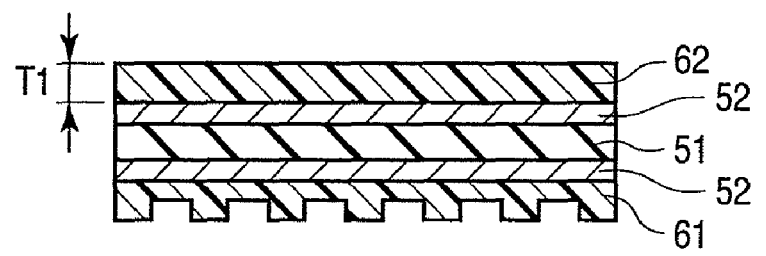
FIGS. 4A to 4D are sectional views showing another embodiment of the pattern transfer method.

As shown in FIG. 4A, the magnetic layer 52 preformed on the other surface of the glass substrate 51 was spin-coated, so as not to cover the central hole, with a 2P resin having a viscosity of 5 cps, and the 2P resin was spread at a rotational speed of 10,000 for 30 seconds, thereby forming a 2P resin layer 62 having a thickness T1 of 60 nm.

Figure 4B:
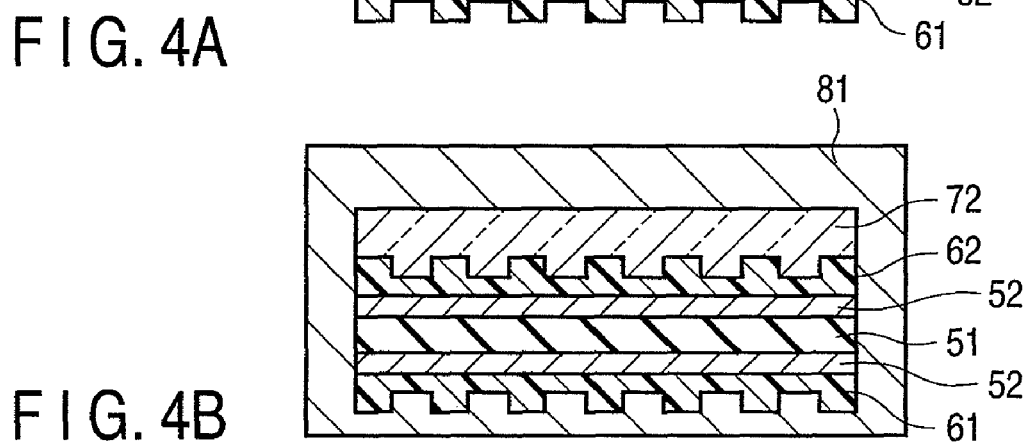

As shown in FIG. 4B, a second transparent resin stamper 72 having three-dimensional patterns was prepared. In the vacuum chamber 81, the other surface of the glass substrate 51 and the pattern surface of the second transparent stamper 72 were bonded via the 2P resin layer 62 in a vacuum ambient at $10^3$ Pa or less.

Figure 4C:
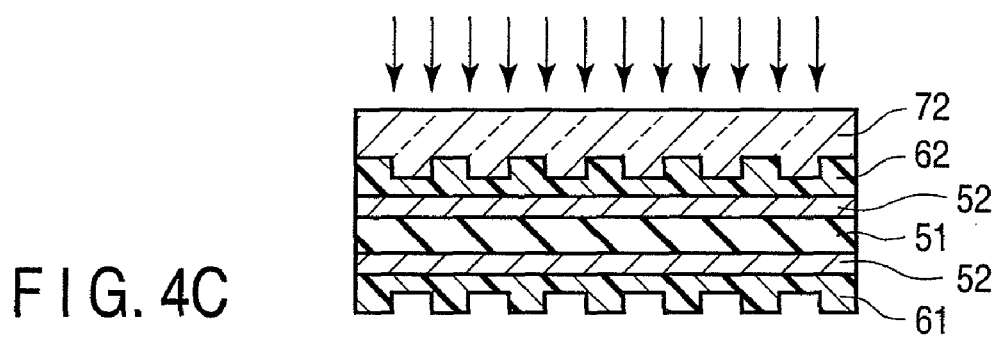

As shown in FIG. 4C, the vacuum wave released, and the 2P resin layer 62 was cured by UV radiation through the second transparent stamper 72 at atmospheric pressure.

Figure 4D:
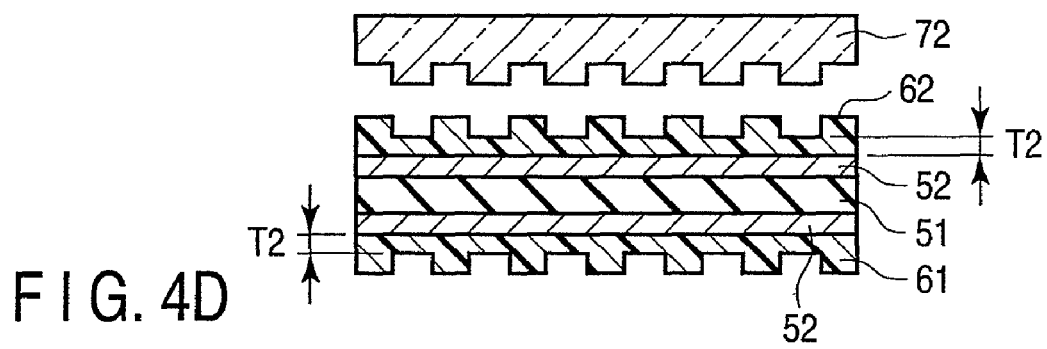

As shown in FIG. 4D, the second transparent stamper 72 was separated from the glass substrate 51, thereby forming a 2P resin layer 62 onto which the three-dimensional patterns were transferred. A thickness T2 of the 2P resin layer 62 remaining in recesses was 30 nm.

Note that although the glass substrate was coated with the 2P resin in FIGS. 3A to 4D, it is also possible to coat the pattern surface of the transparent stamper with the 2P resin, or coat both the glass substrate and transparent stamper with the 2P resin.

Then, the residue of the 2P resin was removed by oxygen gas reactive ion etching (RIE). Subsequently, an etching mask used to remove the residue produced in the imprinting step was used to process the magnetic material by etching (Ar ion milling) by using an Ar ion beam. After that, the 2P resin was removed, and projections and recesses were covered with a nonmagnetic material. Etch back was performed until a carbon protective film on the magnetic film was exposed, and a C protective film was formed after that. In this manner, a magnetic recording medium was manufactured.

FIG. 5 is a view showing a magnetic recording/reproduction apparatus for evaluating the RRO of the magnetic recording medium and performing recording and reproduction on the magnetic recording medium.

This magnetic recording apparatus includes, in a housing 61, a magnetic recording medium 62, a spindle motor 63 for rotating the magnetic recording medium 62, a head slider 64 including a recording/reproduction head, a head suspension assembly (a suspension 65 and actuator arm 66) for supporting the head slider 64, a voice coil motor 67, and a circuit board.

The magnetic recording medium 62 is attached to and rotated by the spindle motor 63, and various digital data are recorded by the perpendicular magnetic recording method. The magnetic head incorporated into the head slider 64 is a so-called composite head, and includes a write head having a single-pole structure and a read head using a GMR film or TMR film. The suspension 65 is held at one end of the actuator arm 66, and supports the head slider 64 so as to oppose it to the recording surface of the magnetic recording medium 62. The actuator arm 66 is attached to a pivot 68. The voice coil motor 67 is formed as an actuator at the other end of the actuator arm 64. The voice coil motor 67 drives the head suspension assembly to position the magnetic head in an arbitrary radial position of the magnetic recording medium 62. The circuit board includes a head IC, and generates a voice coil motor driving signal, and control signals for controlling read and write by the magnetic head. The RRO of the processed magnetic recording medium was measured by checking the displacement amount of a positional error tracking servo signal by using the above magnetic disk apparatus. Similarly, this magnetic disk apparatus was used to record information on the processed magnetic recording medium, and measure the bit error rate of a reproduction signal.

Embodiment 1

The RRO of the dummy groove of the transparent stamper A formed by injection molding was evaluated.

FIG. 6 shows the result.

FIG. 6 is a graph showing the relationship between the eccentric order and displacement amount.

As shown in FIG. 6, a maximum displacement amount was 0.65 between the 15th and 40th orders.

Then, a perpendicular magnetic recording layer was formed as follows.

A glass substrate (amorphous substrate MEL3 2.5 inches in diameter manufactured by MYG) was placed in a film formation chamber of a DC magnetron sputtering apparatus (C-3010 manufactured by Anelva), and the film formation chamber was evacuated until the vacuum degree reached $1 \times 10^{-5}$ Pa.

A 100-nm-thick Co90at%-Zr5at%-Nb5at% film as a soft magnetic layer and a 20-nm-thick Ru film were formed on the substrate, thereby forming a soft magnetic backing layer.

Then, a 5-nm-thick (Co86at%-Ir14at%)-8 mol% $SiO_2$ film was formed as an underlying layer, and a 15-nm-thick Co28at%-Cr6at%-Pt16at%-8 mol% $SiO_2$ film was formed as a perpendicular magnetic recording layer.

Figure 7:
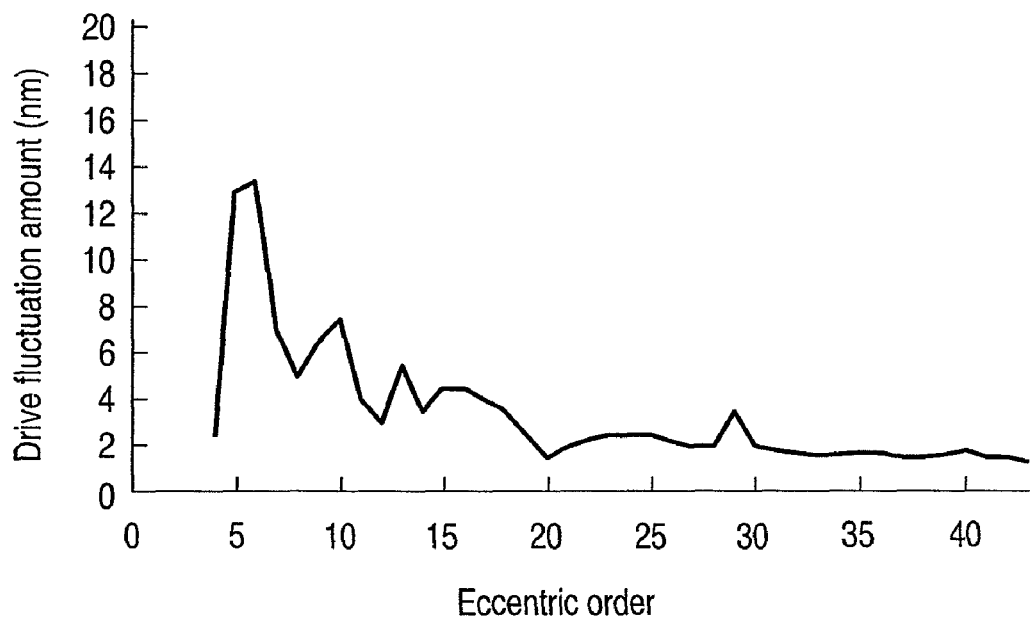
FIG. 7 is a graph showing the eccentric order and displacement amount of a drive according to Embodiment 1.

In addition, the perpendicular magnetic recording layer was coated with the 2P resin as described above. A magnetic recording medium was formed by transferring patterns as described previously by using the transparent stamper A, and the RRO was evaluated using a hard disk drive. FIG. 7 shows the result.

FIG. 7 is a graph showing the relationship between the eccentric order and drive fluctuation amount.

As shown in FIG. 7, the result was good.

Also, the recording characteristic was evaluated using the hard disk drive (HDD). As a consequence, the bit error rate (bER) was $5e^{-7}$, i.e., a favorable result was obtained. Note that in this embodiment, the bit error rate is defined as favorable when it is $1 \times 10^{-6}$ or less when measured in the track center.

Embodiment 2

Figure 8:
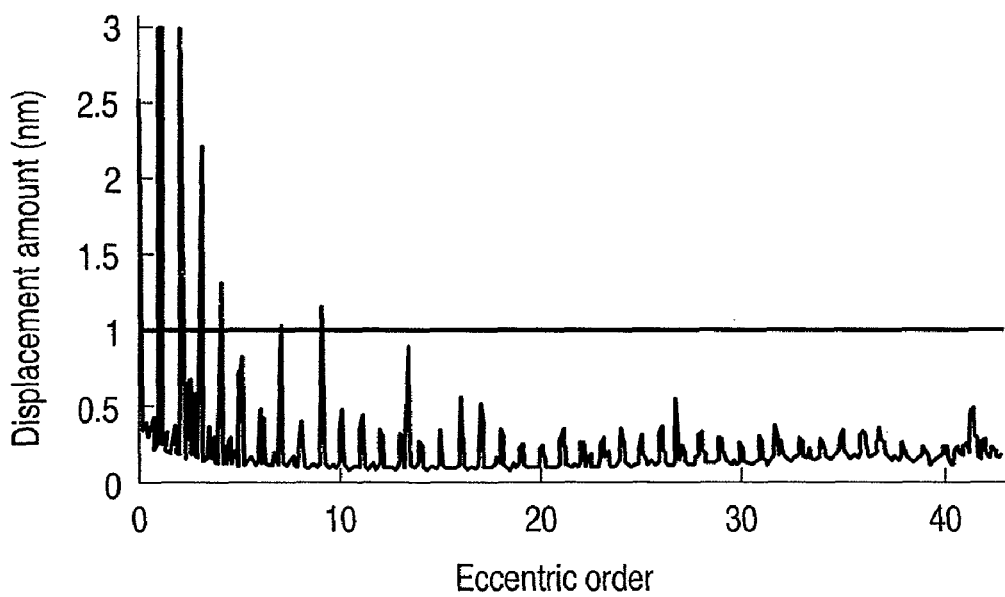
FIG. 8 is a graph showing the eccentric order and displacement amount of a dummy groove according to Embodiment 2.

The RRO of the dummy groove of the transparent stamper B formed by injection molding was evaluated following the same procedures as in Embodiment 1. Consequently, a maximum displacement amount between the 15th and 40th orders was 0.54. FIG. 8 shows the result. Similarly, a magnetic recording medium was formed using the transparent stamper B, and the RRO was evaluated using a hard disk drive. As a consequence, the RRO was better than that of Embodiment 1. FIG. 9 shows the result.

Also, when the recording characteristic was evaluated, the bit error rate was $2.0 \times 10^{-7}$, i.e., found to be favorable.

Embodiment 3

Figure 11:
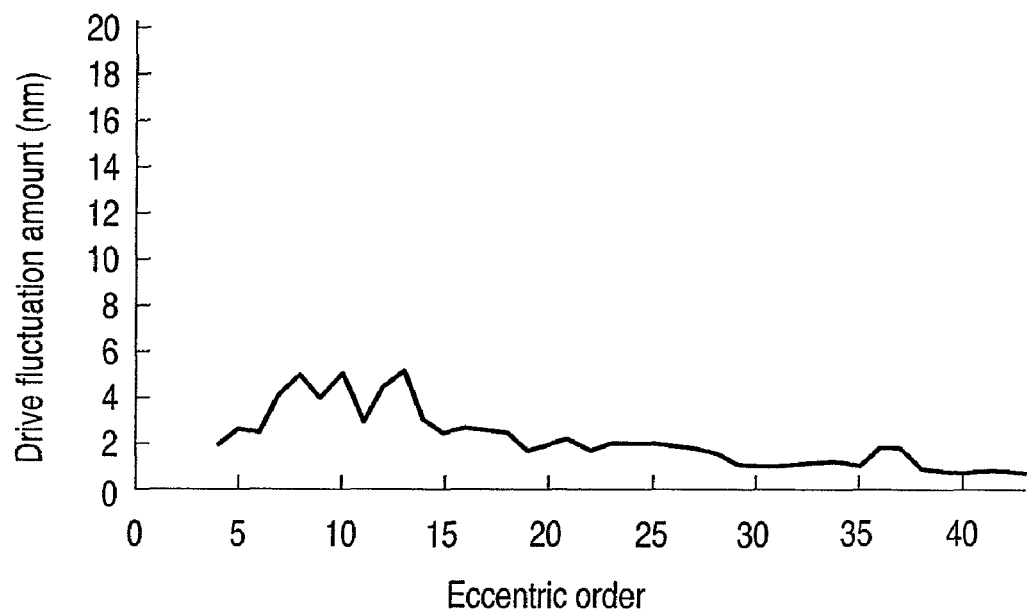
FIG. 11 is a graph showing the eccentric order and displacement amount of a drive according to Embodiment 3.

The RRO of the dummy groove of the transparent stamper C formed by injection molding was evaluated following the same procedures as in Embodiment 1. Consequently, a maximum displacement amount between the 15th and 40th orders was as very small as 0.30. FIG. 10 shows the result. Similarly, a magnetic recording medium was formed using the transparent stamper C, and the RRO was evaluated using a hard disk drive. As a consequence, the RRO was better than that of Embodiment 1. FIG. 11 shows the result. Also, when the recording characteristic was evaluated, the bit error rate was $8.5 \times 10^{-8}$, i.e., found to be favorable.

Comparative Embodiment

Figure 12:
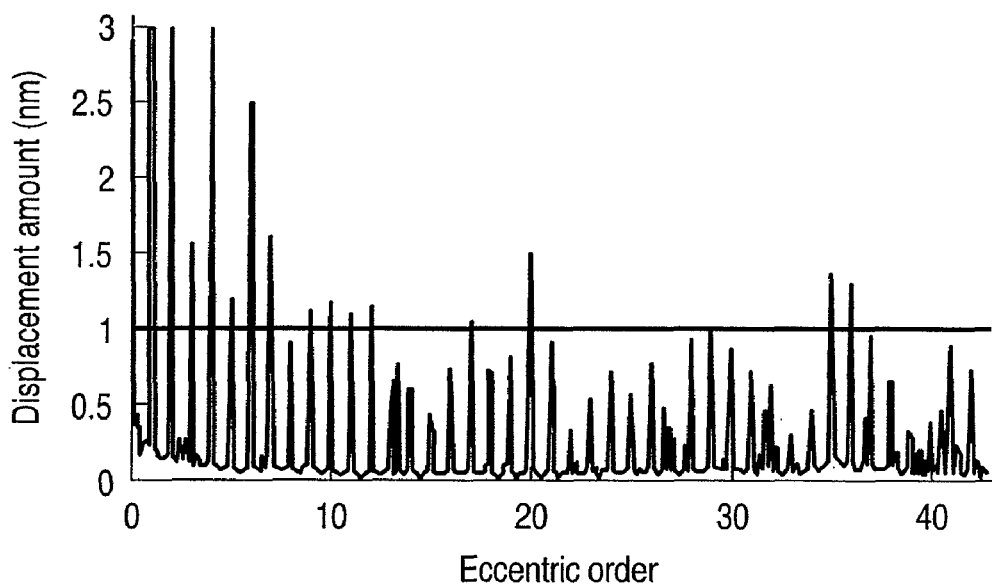
FIG. 12 is a graph showing the eccentric order and displacement amount of a dummy groove according to a comparative embodiment.

The RRO of the dummy groove of the transparent stamper D formed by injection molding was evaluated following the same procedures as in Embodiment 1. Consequently, a maximum displacement amount between the 15th and 40th orders was as very large as 1.5. FIG. 12 shows the result. Similarly, a magnetic recording medium was formed using the transparent stamper D, and the RRO was evaluated using a hard disk drive. As a result, the RRO was very bad as shown in FIG. 13.

When the recording characteristic was evaluated, the bit error rate was $5.5 \times 10^{-5}$, i.e., found to be unfavorable. That is, the recording/reproduction signals were lacking reliability.

Table 1, below, collectively shows the above experimental results.

When using the magnetic recording media formed by using the stampers whose RROs were 0.5 to 1.0 between the 15th and 40th orders, good RRO characteristics were obtained by drive evaluation. When the RRO of the stamper was lower than 0.5, the drive evaluation result further improved. On the other hand, when the RRO of the stamper was larger than 1.0, the drive evaluation result was bad.

TABLE 1

|  | Maximum displacement | Drive evaluation |
| --- | --- | --- |
| Embodiment 1 | 0.65 | ○ |
| Embodiment 2 | 0.54 | ○ |
| Embodiment 3 | 0.30 | ◎ |
| Comparative Embodiment | 1.5 | X |

The above experimental results reveal that the RRO evaluation results of the stampers from the 15th to 40th orders and the drive evaluation results of the magnetic recording media have a correlation. Therefore, more rapid testing can be performed by evaluating the RRO of a stamper without completing a magnetic recording medium. In particular, the RRO of a resin stamper largely changes in accordance with the injection molding conditions. Accordingly, a favorable magnetic recording medium can be formed by selecting the injection molding conditions so as to improve the RRO.

The method of manufacturing the discrete-track magnetic recording medium including the data area and servo area by using the present invention has been explained above. However, the method of the present invention is not limited to this and also applicable to the manufacture of optical disks such as a CD and DVD.

Although the embodiments of the present invention have been explained above, the present invention can be variously changed within the spirit and scope of the invention described in the scope of the appended claims.

Also, the present invention can be variously modified when practiced without departing from the spirit and scope of the invention. Furthermore, various inventions can be made by appropriately combining a plurality of constituent elements disclosed in the above embodiments.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of evaluating a stamper made of a resin and comprising either a concentric three-dimensional pattern or a spiral three-dimensional pattern configured to form a track pattern on a surface of a recording layer of a recording medium, the three-dimensional pattern comprising a main region corresponding to a data area comprising a data recording portion and an address portion of the recording medium, and a dummy region which is not the main region, the method comprising:

checking if a repeatable runout of a three dimensional pattern in the dummy region is equal to or shorter than 1 nm between the 15th and 40th orders when a rotational frequency is the first order as a reference by reproducing information from the dummy region.

2. The method of claim 1, wherein said checking comprises checking if the repeatable run out is equal to or shorter than 0.5 nm between the 15th and 40th orders.

3. The method of claim 1, wherein the stamper is configured to transfer a transfer pattern onto a surface of a resist layer by imprinting.

* * * * *